United States Patent [19]

Shamshoum et al.

[11] Patent Number: 5,395,810

[45] Date of Patent: Mar. 7, 1995

[54] METHOD OF MAKING A HOMOGENEOUS-HETEROGENOUS CATALYST SYSTEM FOR OLEFIN POLYMERIZATION

[75] Inventors: Edwar S. Shamshoum, Houston; Michael J. Elder, Friendswood; Baireddy R. Reddy, Baytown; David J. Rauscher, Webster, all of Tex.

[73] Assignee: Fina Technology, Inc., Dallas, Tex.

[21] Appl. No.: 9,520

[22] Filed: Jan. 27, 1993

Related U.S. Application Data

[62] Division of Ser. No. 768,783, Sep. 30, 1991, abandoned.

[51] Int. Cl.⁶ .............................................. B01J 31/00
[52] U.S. Cl. .................................. 502/113; 502/103; 502/114; 502/115; 502/117; 502/121; 502/125; 502/127; 502/134
[58] Field of Search ............... 502/103, 113, 114, 115, 502/117, 121, 125, 127, 134

[56] References Cited

U.S. PATENT DOCUMENTS 4,701,432  10/1987  Welborn, Jr. ..................... 502/113
5,104,838  4/1992  Fujita et al. ........................ 502/108

FOREIGN PATENT DOCUMENTS 0436328  7/1991  European Pat. Off. .
0436399  7/1991  European Pat. Off. .

OTHER PUBLICATIONS

Zambelli et al., "Isotactic Polymerization of Propene: Homogeneous Catalysts Based on Group 4 Metallocenes without Methylalumoxane", Macromolecules, vol. 22, pp. 2186–2189 (1989).

Fujita et al., "Production of alpha–olefin Polymer", Patent Abstracts of Japan, vol. 15, No. 231, App. No. 01–207562, (1991).

*Primary Examiner*—Asok Pal
*Assistant Examiner*—E. D. Irzinski
*Attorney, Agent, or Firm*—Jim Wheelington; M. Norwood Cheairs

[57] ABSTRACT

This invention concerns a making a catalyst system comprising at least one homogeneous catalyst and at least one heterogeneous catalyst, specifically, a metallocene catalyst and a conventional Ziegler-Natta catalyst, respectively. This invention is useful for making a catalyst for the polymerization of any polymer in which separate polymerizations with a homogeneous catalyst and with a heterogeneous catalyst are possible, but preferably, polymerization of olefins, more preferably, α-olefins, and, most preferably, propylene. This invention provides a catalyst system which facilitates use of a homogeneous catalyst but eliminates the disadvantages of such a system. This invention produces a polymer with molecular weight distribution (MWD) as broad or broader than the MWD of the heterogeneous catalyst alone. Hydrogen can be used to control molecular weight distribution of a polymer produced with this invention.

13 Claims, 3 Drawing Sheets

METHOD OF MAKING A HOMOGENEOUS-HETEROGENOUS CATALYST SYSTEM FOR OLEFIN POLYMERIZATION

This is a division of application Ser. No. 07/768,783, filed on Sep. 30, 1991, and now abandoned.

BACKGROUND OF THE INVENTION

1. Field of the Invention

This invention relates to a catalyst system which is a combination of at least one homogeneous catalyst and at least one heterogeneous catalyst. Changing the homogeneous catalyst used with the heterogeneous catalyst effects the molecular weight distribution of the resulting polymer.

2. Description of the Prior Art

It is known that two or more homogeneous catalysts, such as those based on metallocene compounds, may be combined to effect properties, such as molecular weight distribution. U.S. Pat. No. 4,530,914 discloses use of a catalyst system comprising two or more metallocenes in the polymerization of α-olefins, primarily ethylene, to obtain a broad molecular weight distribution. The metallocenes each have different propagation and termination rate constants. The metallocenes are mixed with an alumoxane to form the catalyst system.

It is also known that metallocenes may be affixed to a support to simulate a heterogeneous catalyst. In U.S. Pat. No. 4,808,561 discloses reacting a metallocene with an alumoxane and forming a reaction product in the presence of a support. The support is a porous material like talc, inorganic oxides such as Group IIA, IIIA IVA OR IVB metal oxides like silica, alumina, silica-alumina, magnesia, titania, zirconia and mixtures thereof, and resinous material such as polyolefins like finely divided polyethylene. The metallocenes and alumoxanes are deposited on the dehydrated support material.

In U.S. Pat. No. 4,701,432 a support is treated with at least one metallocene and at least one non-metallocene transition metal compound. To form a catalyst system a cocatalyst comprising an alumoxane and an organometallic compound of Group IA, IIA, IIB and IIIA is added to the supported metallocene/non-metallocene. The support is a porous solid such as talc or inorganic oxides or resinous materials, preferably an inorganic oxide, such as silica, alumina, silica-alumina, magnesia, titania or zirconia, in finely divided form. By depositing the soluble metallocene on the support material it is converted to a heterogeneous supported catalyst. The transition metal compound, such as $TiCl_4$, is contacted with the support material prior to, after, simultaneously with or separately from contacting the metallocene with the support.

An advantage of a homogeneous (metallocene) catalyst system is the very high activity of the catalyst and the narrow molecular weight distribution of the polymer produced with a metallocene catalyst system. The metallocene catalysts suffer from a disadvantage in that the ratio of alumoxane cocatalyst to metallocene is high, requiring extensive treatment of the polymer product to remove the aluminum. Another disadvantage of the homogenous catalyst system is that the polymer product has small particle size and low bulk density. Another disadvantage of the homogeneous catalyst system is that the reactor fouls during polymerization.

It would be advantageous to provide a catalyst system which facilitates use of a homogeneous catalyst but eliminates the disadvantages of such a system. A combination of a homogeneous catalyst with a heterogeneous catalyst in a single reactor will eliminate the disadvantages of the homogeneous catalyst alone and will facilitate use of a homogeneous catalyst. A combination of a homogeneous catalyst with a heterogeneous catalyst in a single reactor will also provide a means to control molecular weight distribution and polydispersity.

SUMMARY OF THE INVENTION

Figure 1:
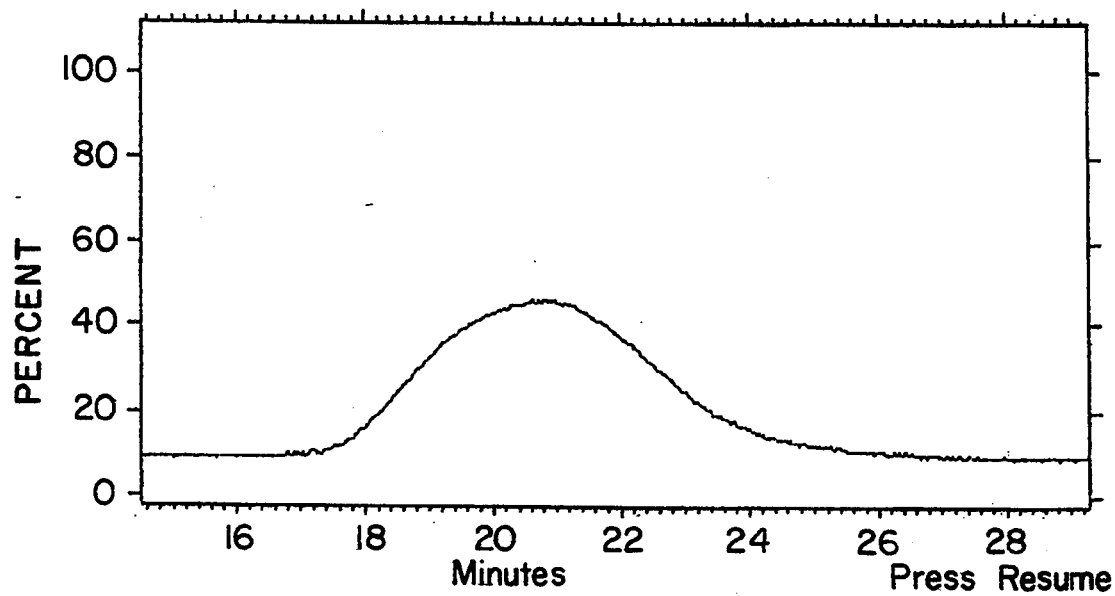
FIG. 1 is a chart of gel permeation chromatography (GPC) of a polymer produced with a conventional Ziegler-Natta heterogeneous catalyst.

Accordingly, an object of this invention is to provide a catalyst system which eliminates extensive treatment of the polymer product to remove impurities.

And, an object of this invention is to provide a catalyst system which produces polymer with little or no small particle size and high bulk density.

Also, an object of this invention is to provide a catalyst system which eliminates reactor fouling during polymerization.

Further, an object of this invention is to provide a catalyst system which controls the molecular weight distribution by varying the catalyst.

Additionally, an object of this invention is to provide a catalyst system which produces polymer with a bimodal molecular weight distribution.

As well, an object of this invention is to provide a catalyst system which produces a reactor blend of polymer with a broad molecular weight distribution in a single reactor.

In addition, an object of this invention is to provide a process for using hydrogen to control molecular weight distribution.

These and other objects are accomplished by a catalyst system comprising at least one homogeneous catalyst and at least one heterogeneous catalyst, i.e., metallocene catalyst and conventional Ziegler-Natta catalyst, respectively.

DETAILED DESCRIPTION OF THE INVENTION

The multi-catalyst system of the present invention is useful in the polymerization of any polymer in which separate polymerizations with a homogeneous catalyst and with a heterogeneous catalyst are possible. Preferably, the multi-catalyst system is useful in the polymerization of olefins, more preferably, α-olefins, and, most preferably, propylene.

The multi-catalyst system of the present invention is obtained by mixing the components of at least one homogeneous catalyst system and at least one heterogeneous system. The components may be combined in any order. Generally, the components of a homogeneous catalyst system are a metallocene compound and an ionizing agent. Generally, the components of a heterogeneous catalyst system are an aluminum alkyl and a transition metal compound with, optionally, an electron donor.

Any of the conventional heterogeneous Ziegler-Natta transition metal compound catalyst components can be used as the heterogeneous catalyst of the catalyst system of the present invention. The compound is preferably of the general formula $MR^+_x$ where M is the metal, R is a halogen or a hydrocarbyloxy and x is the valence of the metal. Preferably, M is a Group IVB, VB or VIB metal, more preferably a Group IVB, and most preferably titanium. Preferably, R is chlorine, bromine, an alkoxy or a phenoxy, more preferably chlorine or ethoxy and most preferably, chlorine. Illustrative examples of the transition metal compound catalyst components are $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

The transition metal compound may be either supported or unsupported. If supported, the support should be an inert solid which is chemically unreactive with any of the components of the heterogeneous or homogeneous catalyst.

The aluminum alkyl is of the general formula $AlR'_3$ where R' is an alkyl of from 1-8 carbon atoms and R' may be the same or different. Examples of aluminum alkyls are trimethyl aluminum (TMA), triethyl aluminum (TEAl) and triisobutyl aluminum (TiBAl). The preferred aluminum alkyl is TEAl.

The electron donor is any one of the electron donors which are effective with Ziegler-Natta catalysts. Typically, an electron donor is an organosilicon compound. Examples of electron donors are cyclohexylmethyl dimethoxysilane (MCDS), diphenyldimethoxysilane (DPMS) and isobutyltrimethoxysilane (IBMS). Other examples of electron donors are disclosed in U.S. Pat. Nos. 4,218,339; 4,395,360; 4,328,122; 4,473,660; 4,562,173 and 4,547,552, which are hereby incorporated by reference.

The homogeneous catalyst component may be a metallocene or cyclopentadienide, i.e., a metal derivative of a cyclopentadiene. The metallocene should contain two cyclopentadiene rings and be of the general formula:

$$R''_b(CpR_4)(CpR'_4)M'R^*_{\nu-2}$$

where R" is a bridge imparting stereoridigity to the structure to the metallocene by connecting the two cyclopentadienyl rings, b is 0 or 1, Cp is a cyclopentadienyl ring, R and R' are substituents on the cyclopentadienyl rings and can be a hydride or a hydrocarbyl from 1-9 carbon atoms, each R and R' being the same or different, each (CpR_4) and (CpR'_4) being the same or different, M' is a Group IIIB, IVB, VB or VIB metal, R* is a hydride, a halogen or a hydrocarbyl from 1-20 carbon atoms, v is the valence of M'. Preferably, b is 1 and R" is a hydrocarbyl radical, more preferably an alkenyl radical having one to four carbon atoms, a dialkyl germanium, a dialkyl silicon, an alkyl phosphine or amine radical, such as a dimethyl silyl radical, an ethylenyl radical or a isopropenyl radical and, most preferably, is an ethylenyl radical. Preferably, $(CpR_4)$ is an substituted cyclopentadienyl ring such that it is 3-t-butyl-cyclopentadienyl, indenyl or cyclopentadienyl and $(CpR'_4)$ is a substituted cyclopentadienyl ring such that it is fluorenyl, indenyl or fluorenyl, respectively; most preferably, $(CpR_4)$ is indenyl and $(CpR'_4)$ is indenyl. Preferably M' is a Group IVB metal, most preferably zirconium, which has a valence of 4. Preferably, R* is a halogen or alkyl, most preferably chlorine or methyl.

The ionizing agent is an alumoxane, an aluminum alkyl, other Lewis acid or a combination thereof which will ionize a neutral metallocene compound to form a cationic metallocene catalyst. Examples of such ionizing agents are methyl alumoxane (MAO), triethyl aluminum (TEAl) and tris(pentafluorophenyl)boron. Other ionizing agents are disclosed in U.S. patent application Ser. Nos. 07/419,057 and 07/419,222 and European Patent Publication Nos. 0-277-003 and 0-277-004 which are hereby incorporated by reference.

Figure 2:
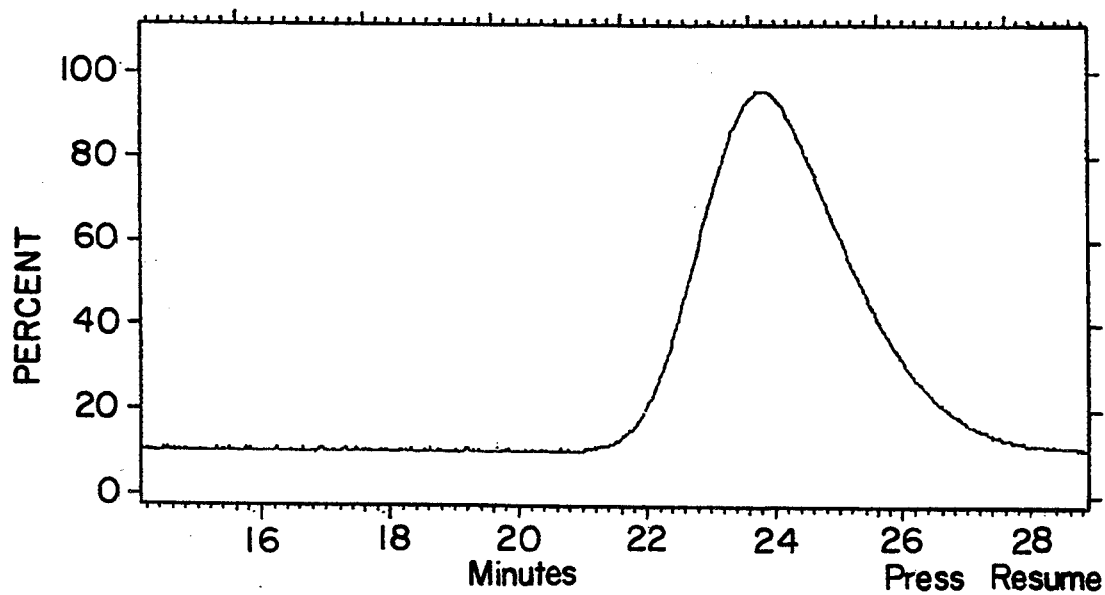
FIG. 2 is a chart of GPC of a polymer produced with a metallocene homogeneous catalyst.
Figure 3:
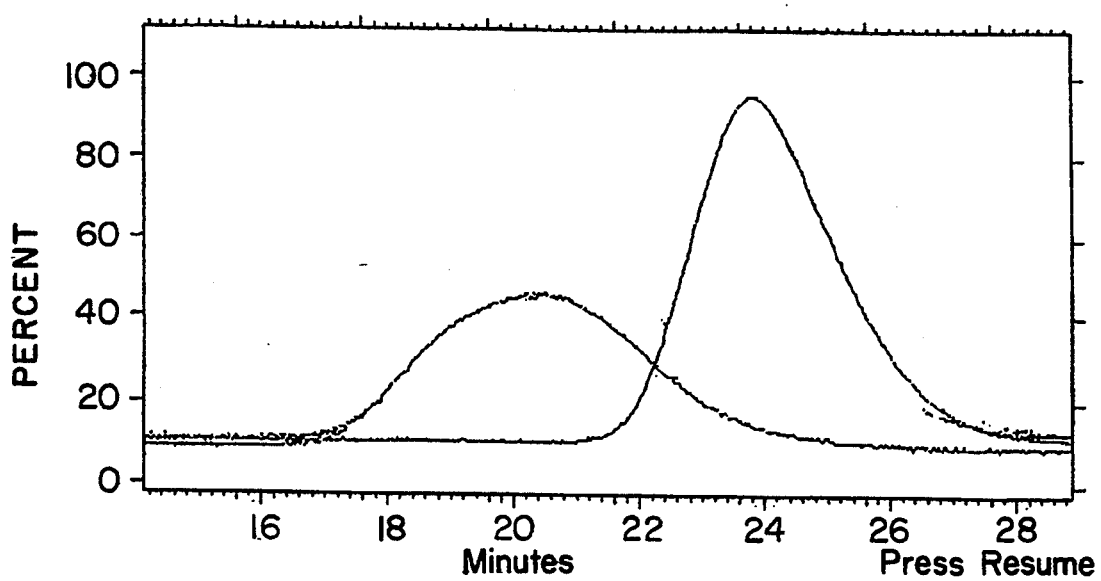
FIG. 3 is an overlay of FIGS. 1 and 2.
Figure 4:
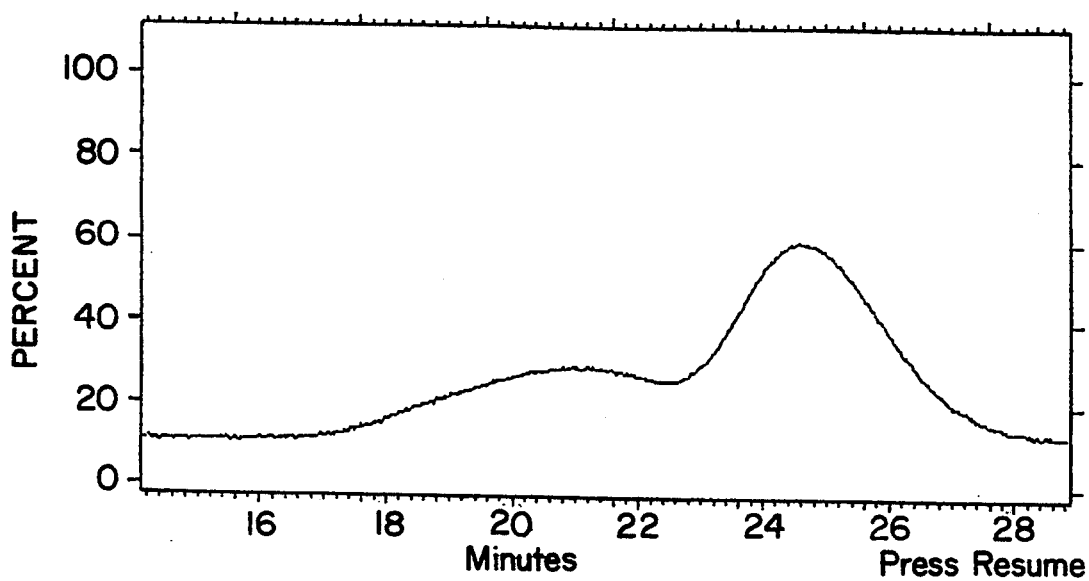
FIG. 4 is a chart of GPC of a polymer produced with a homogeneous-heterogeneous catalyst system.

By using a multi-catalyst system having at least one homogeneous catalyst and at least one heterogeneous catalyst a polymer can be produced with molecular weight distribution (MWD) as broad or broader than the MWD of the heterogeneous catalyst alone. MWD can be represented by a chart of gel permeation chromatography (GPC). The homogeneous catalyst produces a polymer with a MWD which is narrow relative to a polymer produced by a heterogeneous. For example, using a heterogeneous catalyst alone produces a polymer with a MWD of approximately 5-7 (FIG. 1) and using a homogeneous catalyst alone produces a MWD of approximately 2-3.5 (FIG. 2). By superimposing FIG. 1 on FIG. 2 (FIG. 3), it can be predicted that using the two catalysts together will result in a polymer having a MWD of 5-7. When the two catalysts are used together in an actual polymerization, a polymer having a MWD of 5-7 results, as shown is FIG. 4. A comparison of FIGS. 3 and 4 show a near identity in the shape and location of the plot.

By using different ratios of the homogeneous:heterogeneous catalysts, the polydispersity, i.e., the distribution of molecular weights, can be effected. Since the molecular weight of the polymer produced with the homogeneous catalyst is different from that of the heterogeneous catalyst, changing the relative amount of one catalyst to another in a multi-catalyst system of this invention will change the polydispersity of the polymer produced.

Figure 5:
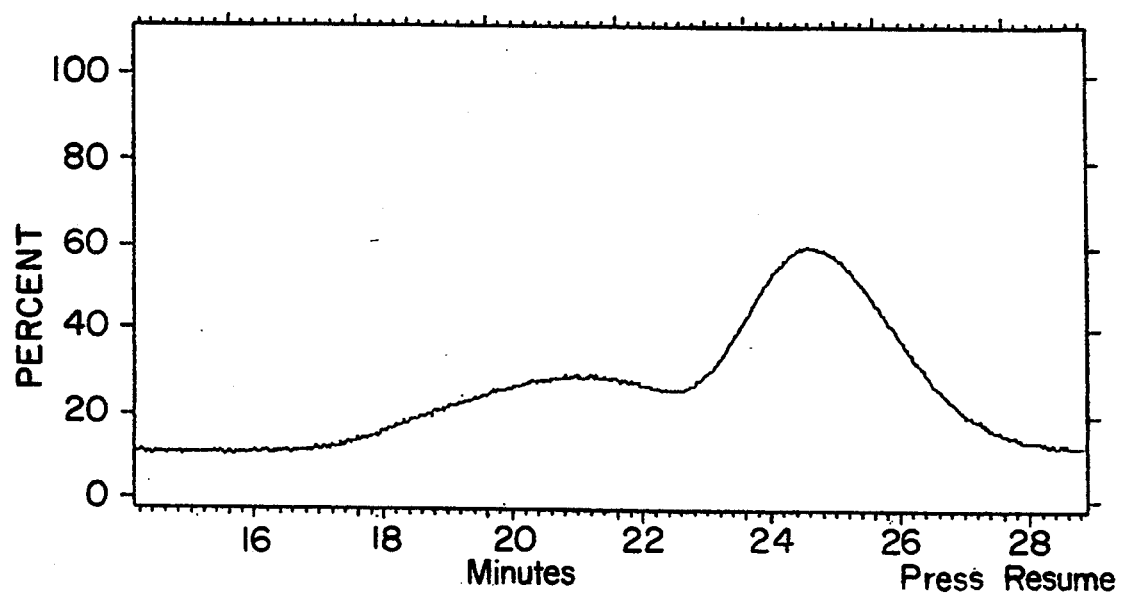
FIG. 5 is a chart of GPC of a polymer produced with a homogeneous-heterogeneous catalyst system and a low level of hydrogen (3.9 mmol).
Figure 6:
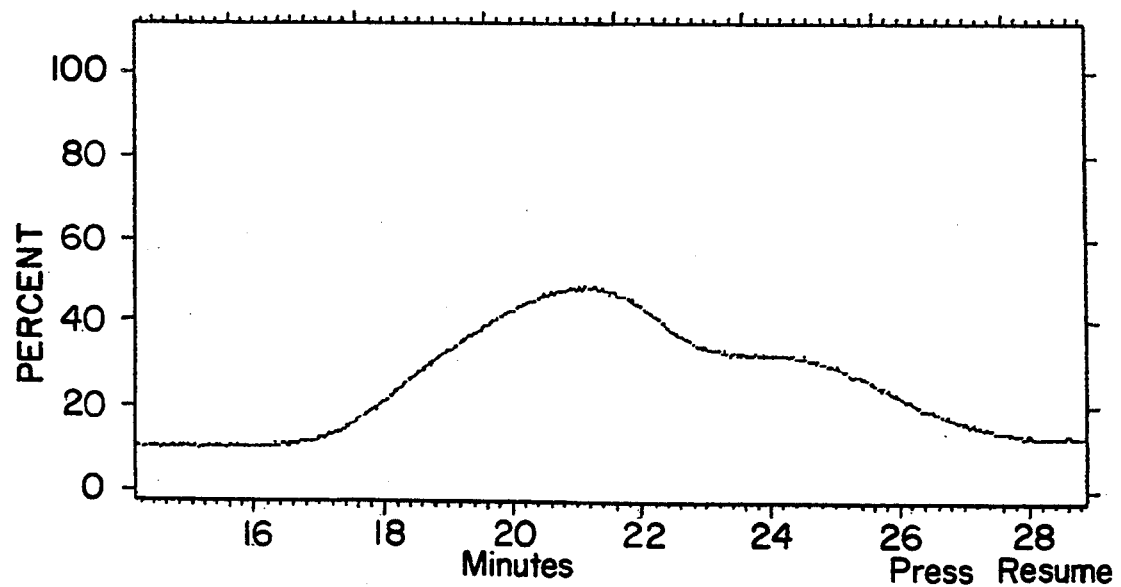
FIG. 6 is a chart of GPC of a polymer produced with a homogeneous-heterogeneous catalyst system and a high level of hydrogen (15.7 mmol).

The effect of hydrogen on a catalyst system having one or more homogeneous catalysts alone is known to be negligible. The effect of hydrogen on a catalyst system having one or more heterogeneous catalysts alone is known to have an inverse proportional effect on the peak molecular weight of the polymer, but there is no effect on molecular weight distribution. However, when a catalyst system comprises one or more homogeneous catalysts and one or more heterogeneous, the effect of hydrogen in decreasing the peak molecular weight of the polymer produced by the heterogeneous catalyst while the polymer produced by the homogeneous catalyst remains unaffected results in on overall change in the molecular weight distribution. The effect of using a relative low amount of hydrogen compared to using a relative high amount of hydrogen is shown in FIGS. 5 and 6, respectively. Therefore, hydrogen can be used to control molecular weight distribution of a polymer produced by a multi-catalyst of the present invention.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

5.0 mg of conventional Ziegler-Natta catalyst was placed in a stainless steel bomb with 0.2 mmol CMDS. 5.0 mg of $Et(Ind)_2ZrCl_2$ were placed in a mixing bottle with 2.0 mmol TEAl. The metallocene-TEAl mixture was placed in the bomb. 2.5 ml of MAO were placed in a second stainless steel bomb. 1.0 liter of propylene was placed in a 2 liter Zipperclave reactor at 30° C. Contents of the first bomb were charged to the reactor with 0.3 liter of propylene and 15.7 mmol of hydrogen. Contents of the second bomb were charged to the reactor with 0.3 liter of propylene. The reactor temperature was increased from 30° C. to 60° C. Polymerization continued for one hour during which time the reactor was maintained at the polymerization temperature. At the end of this time polymerization was terminated by rapidly venting the reactor of unreacted monomer. The polymer yield and analysis is shown in Table I.

EXAMPLE 2

The procedure of Example 1 was followed except 2.5 mg of conventional Ziegler-Natta catalyst and 5.0 mg of $Et(Ind)_2ZrCl_2$ and 3.9 mmol of hydrogen was used. The polymer yield and analysis is shown in Table I.

EXAMPLE 3

5.0 mmol of conventional Ziegler-Natta catalyst were placed in a bomb with 2.0 mmol of TEAl and 0.2 mg of CMDS. 2.5 mg of $Et(Ind)_2ZrCl_2$ were placed in a second bomb with 2.5 ml of MAO. 1.0 liter of propylene was placed in a 2 liter Zipperclave reactor at 32° C. Contents of the first bomb were charged to the reactor with 0.3 liter of propylene and 4 mmol of hydrogen. The contents of the second bomb were charged to the reactor with 0.3 liter of propylene. The reactor temperature was increased from 32° C. to 60° C. Polymerization continued for one hour during which time the reactor was maintained at the polymerization temperature. At the end of this time polymerization was terminated by rapidly venting the reactor of unreacted monomer. The polymer yield and analysis is shown in Table I.

EXAMPLE 4

5.0 mg of conventional Ziegler-Natta catalyst were placed in a stainless steel bomb with 2.0 mmol TEAl and 0.2 mmol of CMDS. 2.5 mg of $Et(Ind)_2ZrCl_2$ were placed in a mixing bottle with 2.5 ml of MAO. The metallocene-MAO mixture was placed in the bomb. 1.0 liter of propylene was placed in a 2 liter Zipperclave reactor at 31° C. Contents of the bomb were charged to the reactor with 0.3 liter of propylene and 4 mmol of hydrogen. The reactor temperature was increased from 31° C. to 60° C. Polymerization continued for one hour during which time the reactor was maintained at the polymerization temperature. At the end of this time polymerization was terminated by rapidly venting the reactor of unreacted monomer. The polymer yield and analysis is shown in Table I.

EXAMPLE 5

The procedure of Example 1 was followed except 2.5 mg of conventional Ziegler-Natta catalyst, 5.0 mg of $Me_2Si(t\text{-}b\text{-}Cp)(Flu)ZrCl_2$ and 4 mmol of hydrogen were used and the initial reactor temperature was 33° C. The polymer yield and analysis is shown in Table I.

TABLE I

| RUN | TEAl (mmol) | CMDS (mmol) | HETEROGENEOUS CATALYST (mg) | METALLOCENE/ AMOUNT */(mg) | MAO (ml) | $H_2$ (mmol) | YIELD (g) | BULK DENSITY (g/cc) | $T_m$ (°C.) | MW** (×1000) | MWD ($M_wM_n$) |
|---|---|---|---|---|---|---|---|---|---|---|---|
| 1 | 2.0 | 0.2 | 5.0 | $Et(Ind)_2ZrCl_2$/2.5 | 2.5 | 15.7 | 105 | 0.42 | 161 | 220 | 21.3 |
| 2 | 2.0 | 0.2 | 2.5 | $Et(Ind)_2ZrCl_2$/5.0 | 2.5 | 3.9 | 164 | 0.50 | 161 | 294 | 13.7 |
| 3 | 2.0 | 0.2 | 5.0 | $Et(Ind)_2ZrCl_2$/2.5 | 2.5 | 3.9 | 235 | 0.48 | 160 | 153 | 15.5 |
| 4 | 2.0 | 0.2 | 5.0 | $Et(Ind)_2ZrCl_2$/2.5 | 2.5 | 3.9 | 67 | 0.48 | 163 | 298 | 13.6 |
| 5 | 2.0 | 0.2 | 2.5 | $Me_2Si(t\text{-}b\text{-}Cp)(Flu)ZrCl_2$/5.0 | 2.5 | 3.9 | 54 | 0.31 | 161 | 224 | 16.4 |

*$Et(Ind)_2ZrCl_2$-ethylenebis(indenyl)zirconium dichloride
$Me_2Si(t\text{-}b\text{-}Cp)(Flu)ZrCl_2$-dimethylsilyl(3-t-butyl-cyclopentadienyl)(fluoroenyl)zirconium dichloride
**obtained from GPC Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States is:

1. A method of making a catalyst system comprising: mixing in any order the components of at least one homogeneous catalyst wherein the components of the homogeneous catalyst comprise:

a) a neutral metallocene of the general formula

    $$R''_b(CpR_4)(CpR'_4)MR^*_{v-2}$$

where R" is a bridge imparting stereorigidity to the structure to the metallocene by connecting the two cyclopentadienyl rings, b is 0 or 1, Cp is a cyclopentadienyl ring, R and R' are substituents on the cyclopentadienyl rings and can be a hydride or a hydrocarbyl from 1–9 carbon atoms, each R and R' being the same or different, each $(CpR_4)$ and $(CpR'_4)$ being the same or different, M is a group IIIB, IVB, VB or VIB metal, R* is a hydride, a halogen or a hydrocarbyl from 1–20 carbon atoms, v is the valence of M and b) an ionizing agent which will ionize a neutral metallocene compound to form a cationic metallocene catalyst and the components of at least one heterogeneous catalyst wherein the components of the heterogeneous catalyst comprise:

a) a transition metal of the general formula $MR^+{}_x$ where M is a Group IIIB, IVB, VB or VIB metal, $R^+$ is a halogen or a hydrocarboxyl and x is the valence of the metal and b) an aluminum alkyl of the general formula $AlR^{\#}_3$ where $R^{\#}$ is an alkyl of from 1-8 carbon atoms and $R^{\#}$ may be the same or different.

2. A method of making a catalyst system as recited in claim 1 wherein b is 1, R" is a hydrocarbyl radical chosen from the group consisting of an alkenyl radical having one to four carbon atoms, a dialkyl germanium, a dialkyl silicon, an alkyl phosphine and an amine radical, M' is a Group IVB metal, R* is a halogen or alkyl.

3. A method of making a catalyst system as recited in claim 2 wherein R" is a dimethyl silyl radical, an ethylenyl radial or a isopropenyl radical.

4. A method of making a catalyst system as recited in claim 3 wherein R" is an ethylenyl radical.

5. A method of making a catalyst system as recited in claim 1 wherein $(CpR_4)$ is an substituted cyclopentadienyl ring such that it is 3-t-butyl-cyclopentadienyl, indenyl or cyclopentadienyl and $(CpR'_4)$ is a substituted cyclopentadienyl ring such that it is fluorenyl, indenyl or fluorenyl, respectively.

6. A method of making a catalyst system as recited in claim 5 wherein $(CpR_4)$ is indenyl and $(CpR'_4)$ is indenyl.

7. A method of making a catalyst system as recited in claim 1 wherein the ionizing agent is chosen from the group consisting of an alumoxane, an aluminum alkyl, other Lewis acids and combinations thereof.

8. A method of making a catalyst system as recited in claim 7 wherein the ionizing agent is methyl alumoxane.

9. A method of making a catalyst system as recited in claim 1 wherein M is titanium and R+ is chlorine or ethoxy.

10. A method of making a catalyst system as recited in claim 1 wherein the heterogeneous catalyst is chosen from the group consisting of $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$.

11. A method of making a catalyst system as recited in claim 1 wherein the aluminum alkyl is chosen from the group consisting of trimethyl aluminum, triethyl aluminum and triisobutyl aluminum.

12. A method of making a catalyst system as recited in claim 1 further comprising adding an electron donor organosilicon compound.

13. A method of making a catalyst system as recited in claim 1 wherein the electron donor is chosen from the group consisting of cyclohexylmethyldimethyoxysilane, diphenyldimethoxysilane and isobutyltrimethoxysilane.

* * * * *